United States Patent
Doumet

Patent Number: 6,050,813
Date of Patent: *Apr. 18, 2000

[54] CONTROL OF CEMENT CLINKER PRODUCTION BY ANALYSIS OF SULFUR IN THE END PRODUCT

[75] Inventor: Joseph Doumet, Jdeideh El-Mein, Lebanon

[73] Assignee: Cement Petcoptimizer Company, Tortola, Virgin Islands (Br.)

[ * ] Notice: This patent is subject to a terminal disclaimer.

[21] Appl. No.: 09/268,676

[22] Filed: Mar. 16, 1999

Related U.S. Application Data

[63] Continuation-in-part of application No. 08/982,367, Dec. 2, 1997, Pat. No. 5,882,190.

[51] Int. Cl.[7] ............................... F27B 15/00; C04B 2/10
[52] U.S. Cl. .............................. 432/106; 432/14; 432/58; 106/758
[58] Field of Search .................. 432/14, 16, 58, 432/106; 106/758

[56] References Cited

U.S. PATENT DOCUMENTS

| | | | |
|---|---|---|---|
| 3,916,025 | 10/1975 | Kunin | 423/242 |
| 4,022,629 | 5/1977 | Garrett et al. | 106/758 |
| 4,024,220 | 5/1977 | Ostroff et al. | 423/242 |
| 4,065,320 | 12/1977 | Heian et al. | 106/100 |
| 4,077,763 | 3/1978 | Jager et al. | 432/14 |
| 4,421,563 | 12/1983 | Cosar | 106/100 |
| 4,465,460 | 8/1984 | Cosar | 432/106 |
| 4,495,162 | 1/1985 | Jons et al. | 423/171 |
| 4,662,945 | 5/1987 | Lawall | 106/100 |
| 4,715,811 | 12/1987 | Lawall | 432/58 |
| 5,336,317 | 8/1994 | Beiswenger et al. | 106/758 |
| 5,356,472 | 10/1994 | Odler | 106/734 |
| 5,380,505 | 1/1995 | College | 423/175 |

FOREIGN PATENT DOCUMENTS

| | | |
|---|---|---|
| 3510491 A1 | 9/1986 | Germany . |
| 3520447 A1 | 12/1986 | Germany . |

*Primary Examiner*—Denise L. Ferensic
*Assistant Examiner*—Gregory A. Wilson
*Attorney, Agent, or Firm*—Fish & Richardson P.C.

[57] ABSTRACT

Cement clinker is produced using high sulfur fuels by combusting high sulfur fuel within a kiln. The feed material is introduced at an inlet of the kiln and is sintered by the combusting fuel to form sintered material. The sintered material is cooled to form cement clinker. The production of the sintered material is controlled by measuring the sulfur content in the cement clinker and using that measurement to control the concentration of oxygen at the inlet of the kiln. The fuel may contain up to 14% sulfur.

19 Claims, 6 Drawing Sheets

CONTROL OF CEMENT CLINKER PRODUCTION BY ANALYSIS OF SULFUR IN THE END PRODUCT

CROSS-REFERENCE TO RELATED APPLICATIONS

This application is a continuation-in-part of U.S. Ser. No. 08/982,367, filed Dec. 2, 1997, now U.S. Pat. No. 5,882,190.

BACKGROUND

The invention is related to producing cement clinker.

In known processes for producing cement clinker, raw material fed into a rotary kiln is preheated and partially decarbonated in a multistage cyclone suspension preheater system and a precalciner by using the heat of combustion gases exhausted from the rotary kiln and precalciner. As the combustion gases and raw material mix, lime (Cao) in the raw material and sulfur dioxide ($SO_2$) in the combustion gases react to form calcium sulfite ($CaSO_3$). The calcium sulfite is formed in the preheater and in the main electrostatic precipitator of the stack. The calcium sulfite, in turn, reacts with oxygen in the preheater system to form calcium sulfate ($CaSO_4$), if there is sufficient oxygen. If there is not enough oxygen in the atmosphere at the kiln's inlet, the calcium sulfate may decompose into lime and sulfur dioxide and leave depositions at the kiln's inlet. If there is an insufficient excess of oxygen in the rotary kiln, the calcium sulfate may decompose at temperatures of 1200° Celsius. Similarly, if there is not enough oxygen in the preheaters, the calcium sulfite may decompose into lime and sulfur dioxide. This decomposition also leads to an increase in sulfur dioxide concentration in the gas in the kiln, which leads to depositions of calcium salts on the shells and walls of the preheater's cyclones and ducts. The level of deposit formation may be increased when the combustion fuel is a solid fuel high in sulfur (i.e., above 2%), such as petcoke, oil shale, and agricultural or industrial wastes, or a fuel oil high in sulfur content because of the resulting increased sulfur dioxide concentration in the kiln gas. The increased sulfur circulating in the gases causes an increase in the quantity of calcium sulfite. This may result in deposits to a level sufficient to close the kiln inlet, preheater, preheater cyclones, and ducts connecting the cyclones, thereby stopping production. The problem can be alleviated by extracting a fraction of the gas between the rotary kiln and preheater and sending it to a bypass tower. In the bypass tower, the gas is quenched with cooler atmospheric air and a dust rich in sulfur dioxide precipitates out. The desulfurized gas is then directed into the preheater, the result being an overall reduction in the concentration of sulfur dioxide in the gas in the preheater. This solution poses two significant problems: a loss in thermal energy and an environmental issue in disposing of the precipitated dust.

Alternatively, the oxygen can be controlled to ensure an excess oxygen concentration in the kiln and eliminate the need for a bypass tower. However, this potential solution is prone to problems associated with oxygen sensor reliability in a kiln environment, which is further reduced at the kiln inlet where oxygen concentration is even more important. At the inlet, the gas intake for oxygen analyzers can be filled by the dust circulating in the kiln environment. Because current oxygen sensors in the kiln environment may be unreliable, it is not practical to provide continuous control of cement clinker production using an oxygen sensor. To provide excess oxygen by merely increasing the flow of air through the kiln, precalciner, and preheaters may create other problems associated with reduced thermal efficiency and pressure loss.

SUMMARY

The method and apparatus of producing cement clinker using high sulfur fuel provides a process having an air intake rate that is regulated based on the quantity of calcium sulfate measured in the cement clinker end product as sulfur or sulfur trioxide ($SO_3$). The air intake rate directly affects the amount of oxygen in the kiln that is available for the reaction converting $CaSO_3$ to $CaSO_4$, and also affects the rate at which they decompose. An increase in the concentration of oxygen to 4.5 to 5.5% increases the temperature at which calcium sulfate decomposes to a temperature greater than the sintering temperature such that $CaSO_4$ becomes a component of the finished product rather than decomposing into gases and leaving deposits in the kiln, preheater, and preheater cyclones. Thus, analysis of the sulfur in the cement clinker end product can be used to control the oxygen concentration in the kiln and thereby indirectly control the proportion of sulfur exiting the system as part of the cement clinker.

The air intake to the kiln is mechanically adjusted by increasing or decreasing the speed of a main exhauster that creates a negative pressure that pulls air into and through the kiln, preheater, preheater cyclone's, and precalciner. The air carries the combusted fuel gases from the kiln and precalciner into the preheater. In the preheater and preheater cyclones, the raw material is preheated and separated from the gases. It also is partially precalcined, i.e., the calcium carbonate in the raw material is partially decomposed into lime and carbonic ($CO_2$) gas. In the precalciner, the raw material is further decarbonated to a level of 90 to 95%. In addition, the gas is desulfurized in the main electrostatic precipitator of the stack and preheater by transfer of the sulfur in the gas to the raw material through the reaction $CaO+SO_2 \rightarrow CaSO_3$. Thus, 90 to 95% of the carbonic gas in the raw material is released before the raw material reaches the kiln inlet.

Control of the air intake may be accomplished when using a rotary kiln for producing the cement clinker. The raw material enters the system as a whole at the upper end of the preheater and enters the rotary kiln through an inlet at the kiln's upstream end, which is connected to the preheater outlet. The inlet also contains a vertical connection to the precalciner through which passes the combustion gases produced by burning fuel at the rotary kiln's burner. The burner, located at the downstream end of the rotary kiln, produces the heat needed for sintering the raw materials in the kiln. The kiln is inclined to facilitate the flow of material. After the cement clinker passes through the kiln's sintering zone, it exits the rotary kiln to the cooler through an outlet adjacent to the burner. The outlet for the cement clinker also serves as an inlet to the rotary kiln for a portion of the air that is blown into the cooler to cool the cement clinker. The air is heated as it cools the cement clinker. The air is blown into the cooler by multiple fans and creates an increase in pressure in the cooler.

The cooling air not flowing into the kiln exits the cooler through two outlets. One outlet directs the air into an electrostatic precipitator to recover fines of the clinker, after which the air is released into the atmosphere. The other outlet directs the air into a dust chamber that returns clinker dust to the cooler and directs the air into the precalciner. A valve on the line between the dust chamber and precalciner regulates the flow of air into the precalciner and affects the proportion of air flowing through these two lines and the kiln. As less air is directed to the precalciner by closing the valve, more air flows through the kiln and electrostatic precipitator of the cooler.

The precalciner decarbonates the raw material using the combustion gases from the rotary kiln and by combusting fuel at a burner in the precalciner. The oxygen for the combustion is supplied as a component of the heated air entering the precalciner from the rotary kiln and through an air inlet connected to the tertiary air duct and located at the base of the precalciner. The raw material feeds into the precalciner from the dust outlet of a cyclone suspension preheater.

The method and apparatus of producing cement clinker using high sulfur fuel permits a more economical use of solid, liquid or gaseous high sulfur fuels in the production of cement clinker in rotary kilns. The method and apparatus also permits operating conditions to be maintained so that the sulfur in the fuel is transferred to the cement clinker in the form of $CaSO_4$, which drastically reduces the $SO_2$ concentration in the process and thereby reduces $SO_2$ emissions. The method and invention improves the process of producing cement clinker by permitting the use of fuels containing up to 14% sulfur and reducing the emissions of $SO_2$ and $NO_x$ gases. For example, the $NO_x$ emission levels may be reduced to 200 mg per normal cubic meter or below. The 14% sulfur limit is based on using fuels with calorific values of approximately 8,000 kilocalories per kilogram of fuel. The $NO_x$ gas emissions are reduced by creating a reducing atmosphere that uses the $O_2$ of the $NO_x$ in the precalciner. Additionally, if there is enough calcium sulfate in the clinker, no additional gypsum needs to be added to act as a cement setting retarder while grinding the clinker for cement production.

In one general aspect, the invention may produce cement clinker using high sulfur fuels combusted in a kiln into which feed material is introduced at an inlet of the kiln. The feed material is sintered to form sintered material, which is cooled to form cement clinker. The process is controlled by measuring the sulfur concentration in the cooled cement clinker at the cement clinker cooler outlet to control the oxygen concentration at the inlet to the kiln. The high sulfur fuel may contain up to 14% sulfur.

Embodiments may include one or more of the following features. For example, the feed material may be precalcined using high sulfur fuels combusted in the precalciner and preheated using the combustion gases from the kiln and precalciner. The oxygen concentration in the precalciner may also be controlled to help use the excess oxygen from the kiln and create a reducing atmosphere in the precalciner to reduce $NO_x$ emissions. The oxygen concentrations in the precalciner and kiln may be varied by adjusting the speed of an exhauster that draws air through the kiln, preheater, and precalciner. A valve positioned in a line between the precalciner and cooler also may be adjusted by a controller to vary the amount of air flowing into the kiln and precalciner.

The oxygen concentration may be controlled to maintain an elevated decomposition temperature of calcium sulfate in the kiln to prevent calcium sulfate decomposition. The fuel used in the burners may contain up to approximately 14% sulfur. The sulfur in the fuel reacts with the CaO of the feed material to form calcium sulfate, which becomes a component of the cement clinker up to weight concentrations of approximately 3.5%. Because of the calcium sulfate in the cement clinker, no gypsum needs to be added while grinding the cement clinker to produce cement. By controlling the oxygen in the kiln, the circulation of $SO_2$ in the kiln can be reduced to less than 80 kg per hour to eliminate deposits in the kiln, cyclones, and ducts connecting the cyclones.

Embodiments also may include a rotary kiln with a burner to sinter the raw material, a cooler to cool the cement clinker, a sulfur analyzer to measure the sulfur content in the cement clinker and a controller to control the oxygen concentration in the kiln based on the measured sulfur content of the cooled cement clinker. The controller may use the measured sulfur content to control the speed of an exhauster to control the oxygen concentration in the kiln. The fuel may contain up to 14% sulfur.

The kiln may be connected to a precalciner that burns high sulfur fuels to precalcine (i.e., decarbonate) the raw material. A cyclone suspension preheater may be connected to the kiln and precalciner to preheat and partially decarbonate the raw material before it enters the kiln. A tertiary air line and valve between the cooler and precalciner may be used to regulate the flow or air to the precalciner. Oxygen sensors may be placed at the kiln inlet and gas outlet from the cyclone suspension preheater to monitor oxygen. The oxygen concentration at the gas outlet of the cyclone suspension preheater may be used by the controller to control the tertiary air line valve. An electrostatic precipitator may be used to filter the air passing from the cooler to the atmosphere.

Other features and advantages will be apparent from the following detailed description, including the drawings, and from the claims.

DETAILED DESCRIPTION

Figure 1:
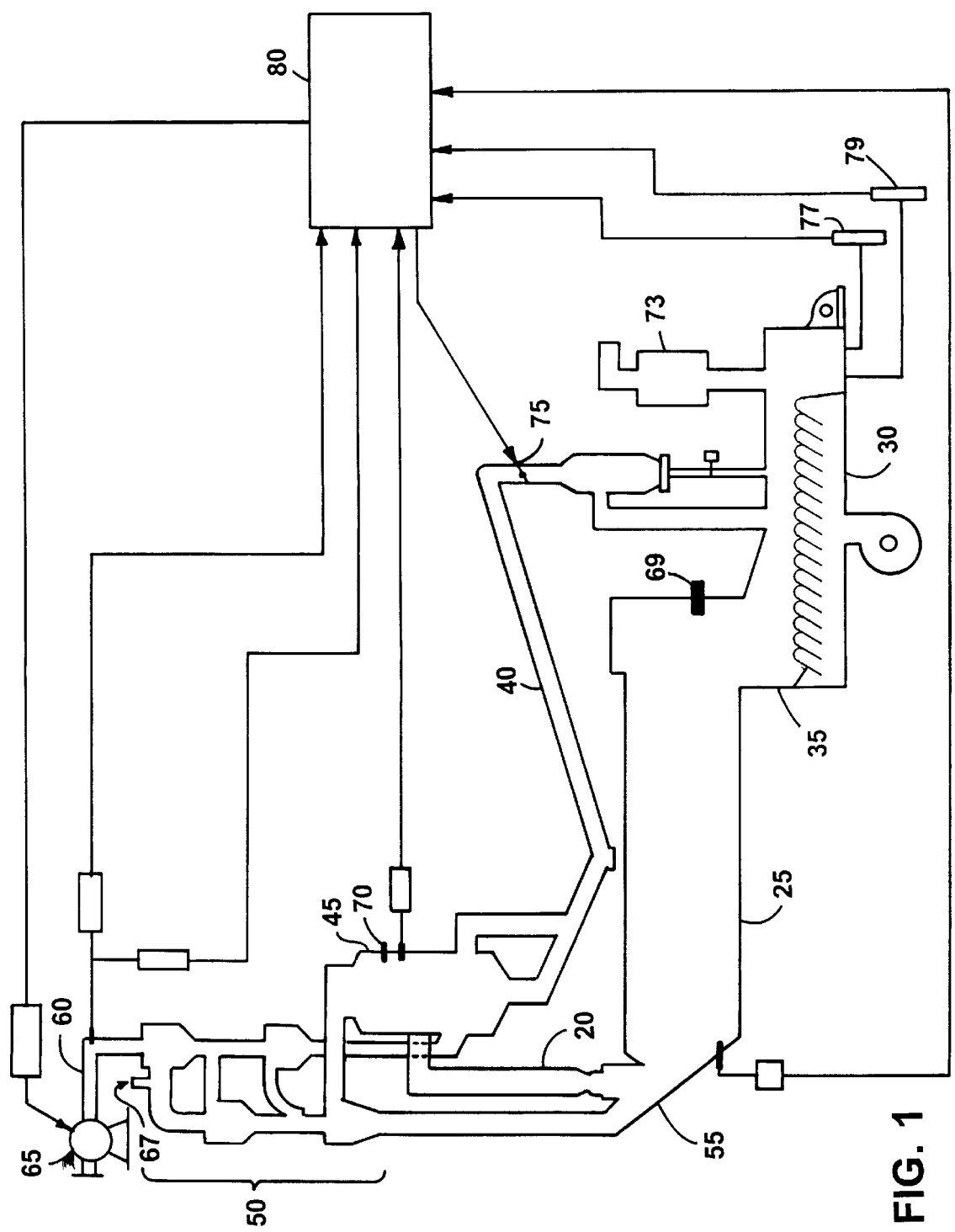
FIG. 1 is a block diagram of a system for producing cement clinker.

Referring to FIG. 1, a system for producing cement clinker includes a rotary kiln 25 and a cement clinker cooler 30 positioned at an outlet 35 of the kiln. A tertiary air duct line 40 connects the cement clinker cooler to a precalciner 45. A gas exhaust line 20 connects the rotary kiln and precalciner. A multiple cyclone suspension preheater system 50 is connected to a rotary kiln inlet 55, to the precalciner 45, and to an outlet line 60 that leads to an exhauster 65.

The raw material is supplied to the system at an inlet pipe 67. The raw material mixes with combustion gases produced at a rotary kiln burner 69 and a precalciner burner 70. The combustion gases are pulled through the kiln 25, suspension preheater system 50 and precalciner 45 by the exhauster 65. The raw material is heated by and separated from the combustion gases in the cyclones of the suspension preheater. The heated raw material flows into the precalciner where the extent of decarbonation is increased. The raw material then flows into the bottom cyclone of the suspension preheater where it is separated from the combustion gases and flows into the inlet of the rotary kiln 25.

The raw material is sintered as it flows through the rotary kiln to form cement clinker. The cement clinker then flows into the cement clinker cooler through kiln outlet 35. The cement clinker is cooled by cooling air blown across its grate. The cooling air then flows into the rotary kiln 25, the tertiary air duct line 40, and an electrostatic precipitator 73. The electrostatic precipitator filters the excess of air of the cooler before releasing it into the atmosphere.

The flow of oxygen into the kiln and precalciner is controlled by the exhauster that pulls air through the system. The flow of oxygen into the precalciner also is controlled by the position of a tertiary air duct valve 75. The concentrations of sulfur are measured and those values are used by a control box 80 to change the speed of the exhauster.

Two important aspects of the invention are the use of high sulfur fuel at the burners and purging sulfur from the process by discharging it as a component of the cement clinker end product in the form of calcium sulfate. To permit use of high sulfur fuel and to purge sulfur as a component of the end product, the speed control of the exhauster 65 is regulated to control the amount of oxygen in the kiln 25. (Excess oxygen prevents the decomposition of calcium sulfate at the sintering temperature of the clinker.) The speed of the exhauster is controlled based on the quantity of sulfur or sulfur trioxide in the cooled cement clinker, as measured by a pair of sulfur analyzers 77 and 79 that analyze the clinker at the outlet to cooler 30. The analysis of the sulfur in the cooled cement clinker shows the extent to which the sulfur in the fuel and raw material is being discharged into the clinker. If the sulfur content must be increased, the control box increases the speed of the exhauster.

Figure 2:
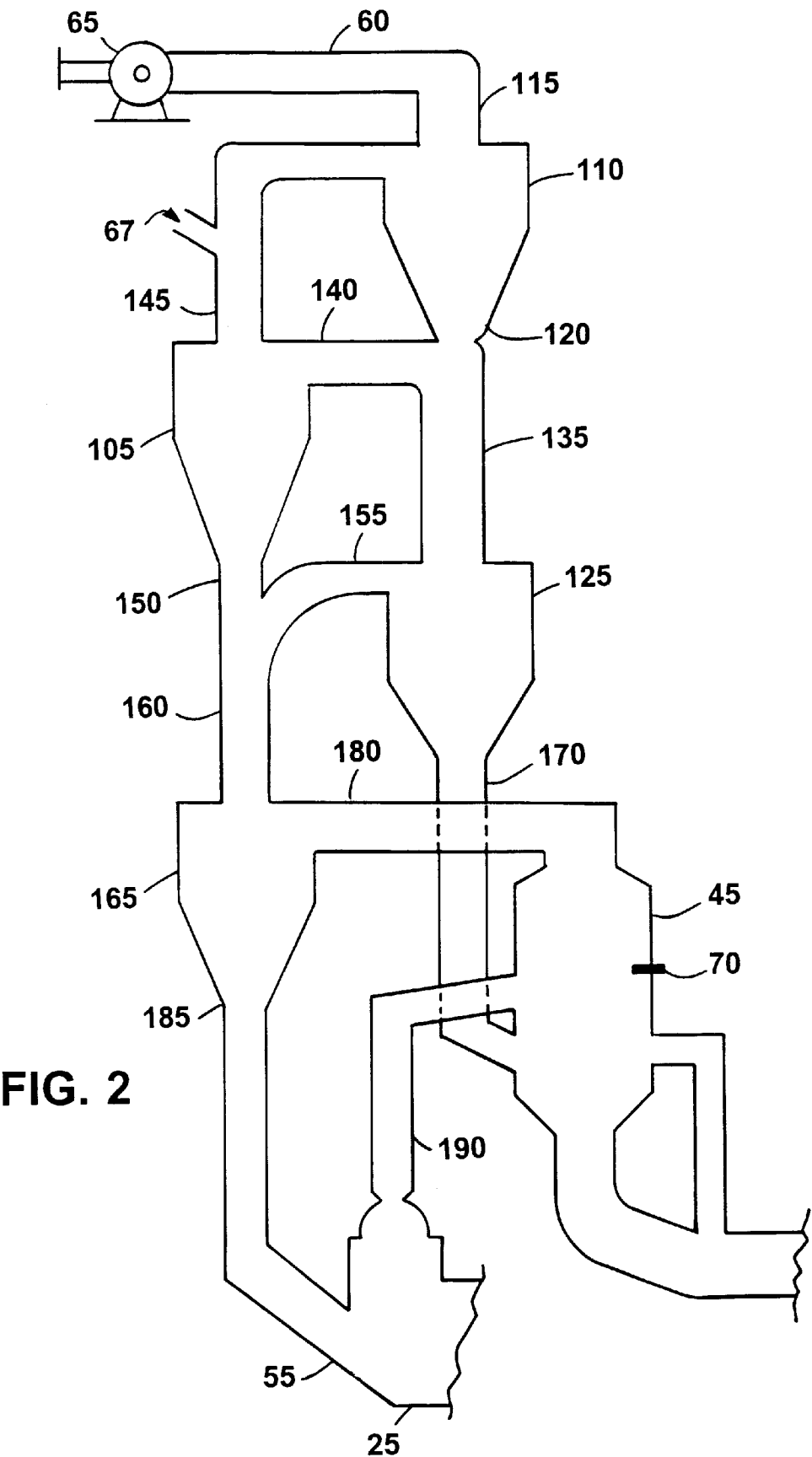
FIG. 2 is a diagrammatic view of cyclone suspension preheaters, a precalciner and a rotary kiln inlet section of the system of FIG. 1.

As shown in FIG. 2, the preheater 50 may be implemented using a suspension preheater containing four cyclones. As described below, three of the cyclones heat the raw material before it passes through the precalciner, and the fourth heats and separates the heated material from gases before the heated material is fed into the rotary kiln's inlet.

The raw material is fed in at inlet pipe 67 and the majority of the material passes through a gas outlet 145 into a cyclone 105. A portion of the material fed in at inlet pipe 67 is carried in the gas flowing out of cyclone 105 into a twin cyclone 110 of suspension preheater 50. Twin cyclone 110 is constructed to separate the fine raw material that entered it from inlet 67 in the ascending gases. In twin cyclone 110, the cyclone effect separates the gas from most of the raw material into a gas stream exiting the preheater at a gas outlet 115 and a raw material stream exiting from a dust outlet 120. Gas outlet 115 of preheater 50 is connected to intake piping 60 for exhauster 65, which pulls air through the entire system.

The raw material passes downward through the cyclones of the preheater while the gases pass upward through the cyclones. Dust outlet 120 of twin cyclone 110 feeds raw material into a line connected to a gas outlet 135 of a cyclone 125 and an inlet 140 of cyclone 105. The gas stream from cyclone 125 combines with most of the raw material and further heats that raw material before the combined streams enter cyclone 105. The remainder of the raw material flows into cyclone 125. In cyclone 105, the cyclone effect separates the gas and raw material into a gas stream exiting at the gas outlet 145 and a raw material stream exiting at a dust outlet 150.

Dust outlet 150 feeds the raw material into a line connected to a gas outlet 160 of a cyclone 165 and an inlet 155 of cyclone 125. Part of the raw material passes into cyclone 165 and part into outlet 170 of cyclone 125. The material flowing into cyclone 165 passes through a dust outlet 185 into a rotary kiln inlet 55, which is connected by a line 190 to precalciner 45. A large portion of the hot gases in the rotary kiln 25, and some of the raw material, is sucked through line 190 into precalciner 45. The remainder of the raw material passes into rotary kiln 25. In cyclone 125, the cyclone effect separates the gas from the majority of the raw material into a gas stream exiting at a gas outlet 135 of cyclone 125 and a dust stream exiting at a dust outlet 170 of cyclone 125. The dust stream feeds into precalciner 45.

The raw material fed into precalciner 45 through lines 190 and 170 is further decarbonated by the heat produced at a secondary burner 70 and carried in the combustion gases to an inlet 180 of cyclone 165. In cyclone 165, the cyclone effect separates the gas from most of the raw material into a gas stream and a raw material stream. The gas stream flows out of gas outlet 160 of cyclone 165 into inlet 155 of cyclone 125. As described above, the raw material stream passes through a dust outlet 185 of cyclone 165 and feeds into the raw material inlet 55 of rotary kiln 25.

Figure 3:
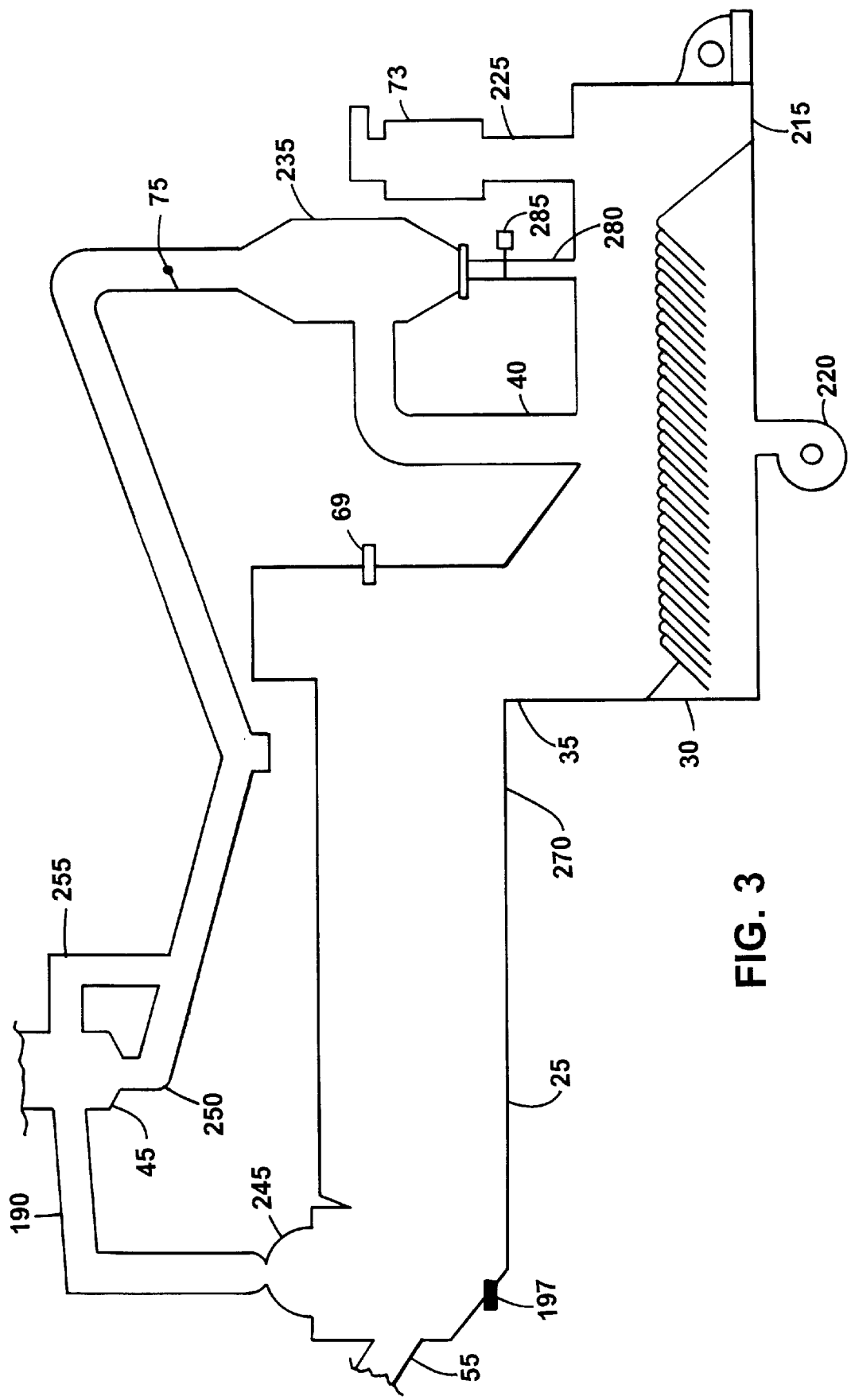
FIG. 3 is a diagrammatic view of a rotary kiln, precalciner, cement clinker cooler, tertiary air duct line, dust chamber, and electrostatic precipitator of the cooler of the system of FIG. 1.

Referring to FIG. 3, the raw material, which is highly decarbonated, is fed into rotary kiln 25 at rotary kiln inlet 55. The material continues to flow in the direction of the outlet 35 of kiln 25 and, in the clinkerization zone, is sintered by gas combusted at kiln burner 69. The sintered material (i.e., cement clinker) flows from rotary kiln 25 into clinker cooler 30 through kiln outlet 35. Cooled cement clinker flows out of clinker cooler 30 at a clinker outlet 215. A cooling fans system 220 blows cooling air across the cement clinker. The cooling air exits cooler 30 through an excess air exit 225, tertiary air duct line 40, and kiln outlet 35.

The air flowing into tertiary air duct line 40 passes through a dust chamber 235 before flowing into precalciner 45. The dust recovered in the dust chamber 235 is returned to cooler 30 through a line 280 connecting dust chamber 235 to cooler 30. Line 280 contains a counter weight flap 285 to control the flow of dust into the cooler 30. The air flows into precalciner 45 through a pair of tertiary air duct outlets 250 and 255. Tertiary air duct valve 75, which is positioned between dust chamber 235 and precalciner 45, controls the rate of flow of air into precalciner 45. Adjusting valve 75 also affects the rate of flow of air through excess air exit 225 into electrostatic precipitator 73 and through kiln outlet 35. To provide a slight increase in the oxygen concentration in the kiln without increasing the speed of the exhauster, valve 75 can be adjusted to send less air to the precalciner based on the concentration of oxygen at the preheater outlet 60. The air exiting into kiln 25 through kiln outlet 35 flows through the kiln, exits the kiln through a kiln gas outlet 245 and flows into precalciner 45 through line 190. The air flowing through the precalciner is pulled by the negative pressure created by exhauster 65 connected to inlet piping 60.

Figure 4:
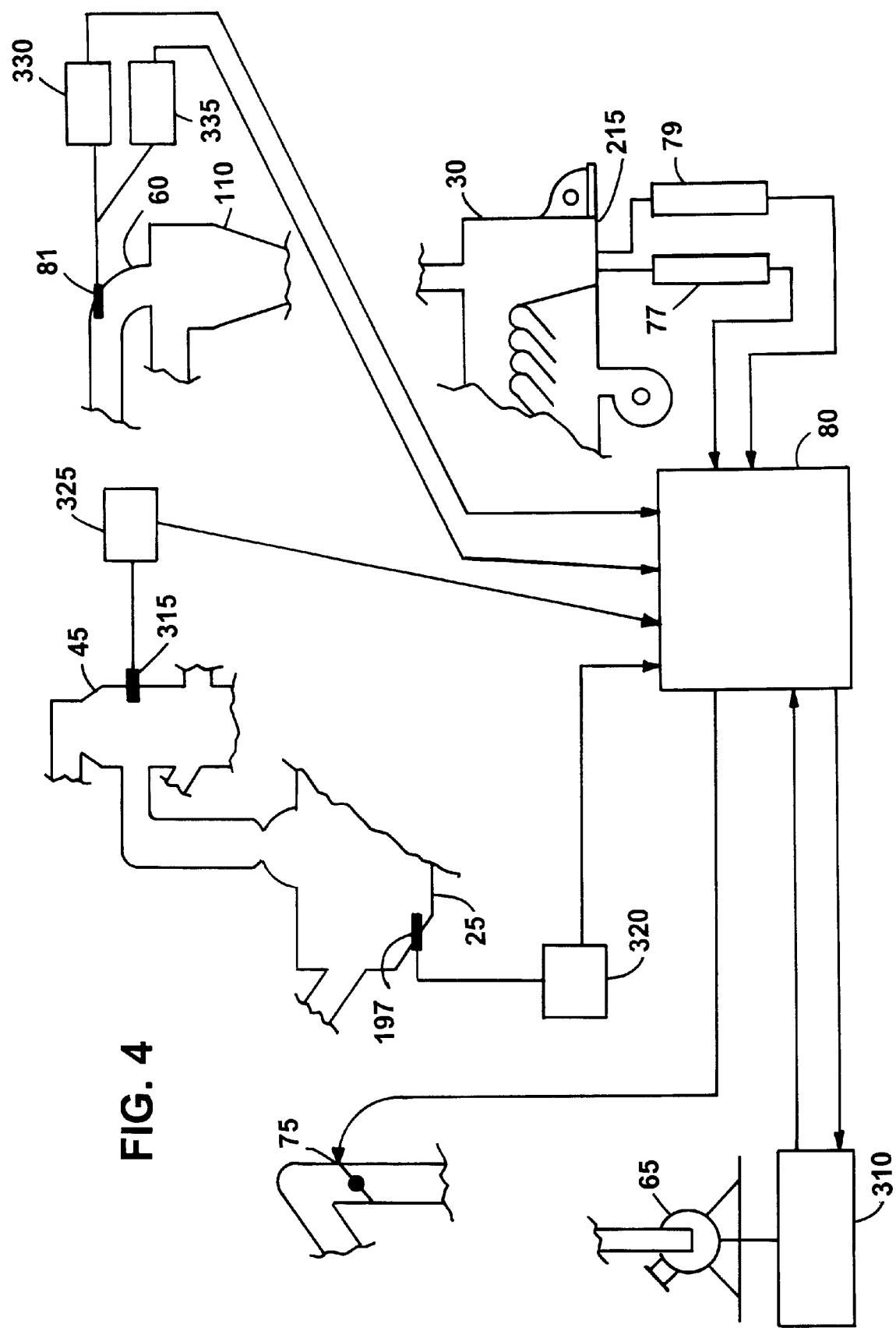
FIG. 4 is a block diagram of a control system for the system of FIG. 1.

Referring to FIG. 4, control box 80 controls the speed of exhauster 65 through motor controller 310. Control box 80 also controls the position of the tertiary air duct valve 75. Control box 80 controls the speed of exhauster 65 to feed enough oxygen to the sintering zone based on the sulfur concentration in the cooled cement clinker at a cooler outlet 215. As described above, sufficient oxygen in the sintering zone will prevent calcium sulfate decomposition so that the calcium sulfate becomes a part of the cooled cement clinker.

The oxygen concentration is measured at duct 60 by an oxygen analyzer 335. The value measured by oxygen analyzer 335 is sent to control box 80, which regulates the position of tertiary air duct valve 75 to keep the oxygen level less than 1.5 to 2% in the line to exhauster 65. This regulation permits the use of the excess oxygen leaving the sintering zone of the rotary kiln 25 and part of the oxygen of the $NO_x$ pollutants that could have been produced in rotary kiln 25. Control box 80 also receives an oxygen concentration value from an oxygen analyzer 320, which measures the oxygen concentration at the kiln inlet. This value is used for recording purposes only because oxygen sensors in environments such as a kiln inlet are unreliable.

A carbon monoxide analyzer 315 measures the concentration of carbon monoxide at duct 60 and sends the value to control box 80. The concentration of carbon monoxide at duct 60 is monitored as a means of preventing an explosion at a downstream main electrostatic precipitator, which can occur if the carbon monoxide concentration rises too high. If the carbon monoxide concentration measured in duct 60 rises above 0.6%, control box 80 shuts off the flow of fuel to burners 69 and 70. After the condition is corrected, a push button on control box 80 permits fuel to flow to burners 69 and 70. If the concentration of oxygen or carbon monoxide is measured to be zero, control box 80 gives an alarm indicating that the gas intakes for analyzers 335 and 315 need to be cleaned to remove a build up of material.

Figure 5:
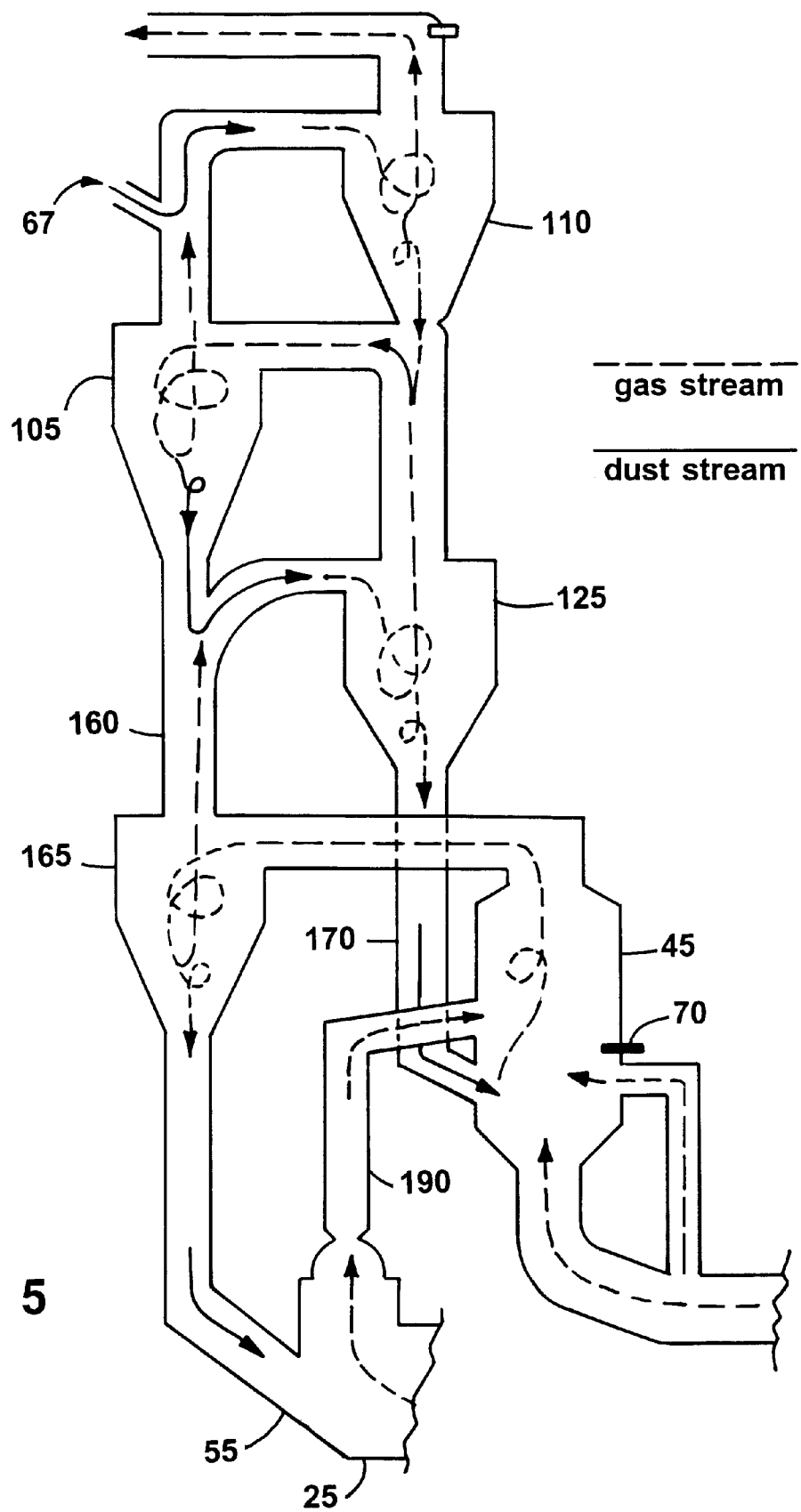
FIG. 5 is a flow diagram showing the flow of material through the cyclone suspension preheaters, precalciner, and rotary kiln inlet of the system of FIG. 1.

FIG. 5 further illustrates the flow of material and gases through the preheater's cyclones and precalciner. The majority of the raw material introduced at inlet 67 passes into cyclone 105. Some of the finer raw material is carried to cyclone 110 in the upward draft of the gas from cyclone 105. As the material passes through the gas, it is heated by the gas. Also, the sulfur dioxide in the gas reacts with the lime in the raw material to form $CaSO_3$, thereby stripping sulfur dioxide out of the gas. This reaction is not limited to cyclone 105 but occurs in the other cyclones, precalciner 45, and their inlet and outlet lines.

In cyclone 110, the cyclone effect separates the gas from the fine raw material by sending the gas out of the top of the cyclone and the raw material out of the bottom of the cyclone. The gas exiting the cyclone is pulled through the line by the exhauster and vented into a separate system, described below, that includes an electrostatic precipitator to remove any remaining dust. The exhauster speed determines the rate at which air is pulled into the system and through suspension preheater cyclones 105, 110, 125 and 165 and precalciner 45. The exhauster speed is automatically controlled by control box 80, which adjusts the exhauster's motor speed based on preset parameters and the measured concentrations of sulfur in the cement clinker end product.

Figure 6:
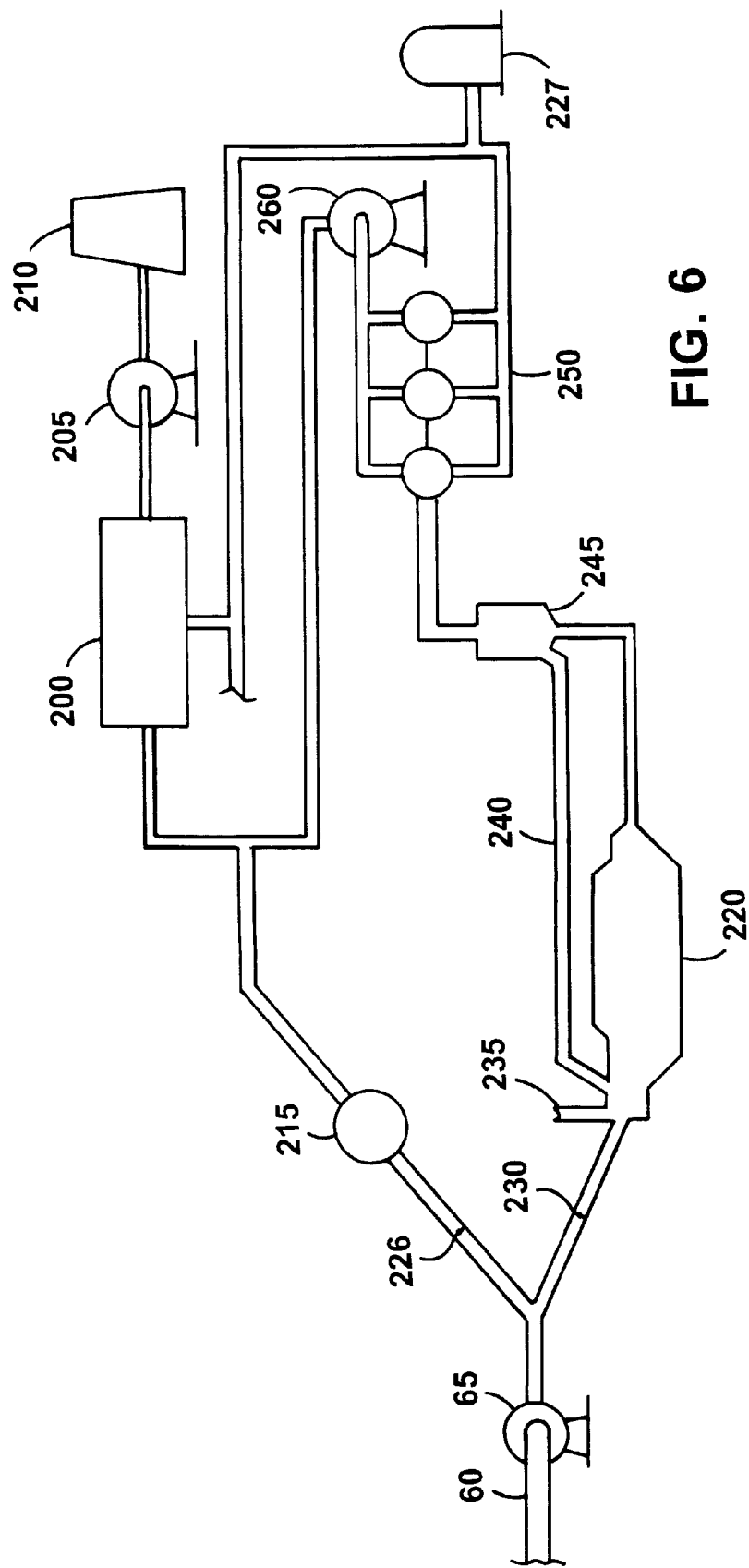
FIG. 6 is a block diagram of the main exhauster and associated equipment of the system of FIG. 1.

Referring to FIG. 6, exhauster 65 directs the gas to a main electrostatic precipitator 200 from which the gases are removed by an exhauster 205 and sent to a stack 210. The gas from exhauster 65 is split into two streams: one stream flowing into a main gas cooling tower 215 and a second stream flowing into a drying mill 220. Both streams are regulated by a pair of controlling flaps 226 and 230. If the mill is stopped, as in the case in which silo 227 is full, all gases are direct to pass through cooling tower 215 before entering electrostatic precipitator 200. If the drying of the raw material requires passing all gases through drying mill 220, flap 226 can be completely closed and flap 230 can be completely opened. The raw material stream flowing into the drying mill 220 has a mill feed inlet 235 and a recycle line 240 for returning coarse material from a separator 245. Drying mill 220 feeds the gas and dried material into the separator 245, in which the coarse particles are separated and returned to the drying mill 220. The remaining material and gas passes through a series of cyclones 250 in which the material is separated from the gas. The finished raw ground material is passed to a storage silo 227. The gas is pulled from the cyclones by an exhauster 260 which directs the gas into a line connected to electrostatic precipitator 200 and which also receives the gas from the main gas cooling tower 215. The dust from the electrostatic precipitator is sent to the storage silo 227 or sent to the kiln feed inlet 67.

Referring to FIG. 5, the cyclone suspension preheater heats the raw material and separates it from the gas. Cyclone 125 and, to a lesser extent, line 190 feed heated raw material into precalciner 45 where the material is almost completely calcined and decarbonated, and carried into cyclone 165 by combustion gases produced at burner 70 of precalciner 45. In cyclone 165, the gas and raw material are separated into two streams. The gas stream exits through gas outlet 160 into the inlet of cyclone 125. The heated raw material exiting cyclone 165 flows into inlet 55 of rotary kiln 25. In addition to heating the raw material, the cyclones and connecting ducts serve as reaction vessels for reacting lime (CaO) in the raw material with sulfur dioxide ($SO_2$) in the combustion gases and raw material to form $CaSO_3$. This reaction removes $SO_2$ from the exhaust gases before they are vented to the atmosphere by exhauster 65.

In rotary kiln 25, $CaSO_3$ in the raw material is oxidized to $CaSO_4$ in the presence of oxygen. The reaction's equilibrium is controlled by the amount of oxygen in rotary kiln 25. An increase in oxygen concentration shifts the reaction equilibrium to favor $CaSO_4$ production. The increase in oxygen also increases the temperature at which $CaSO_4$ will decompose, from 1200° C. to above 1500° C.

Controlling this reaction has four directly related benefits. First, because $CaSO_4$ does not decompose in the kiln, it remains a component of the cement clinker product and reduces or eliminates the need to add gypsum to the final product. Second, $SO_2$, a decomposition product, does not become a component of the exhaust gases vented by exhauster 65, which reduces sulfur emissions of the system.

Third, because the sulfur contained in the fuel becomes a component of the cement clinker, the burners in the kiln and precalciner can be operated using fuels with sulfur contents as high as approximately 10% to 14% before there is too much sulfur in the system and $CaSO_3$ and $CaSO_4$ depositions build up in the vessels. The upper limit of sulfur content in the fuel also is based on the quantity of calcium sulfate permitted in the cement clinker. For example, if it is acceptable for the cement clinker to contain up to approximately 3.5% calcium sulfate, a fuel containing approximately 14% sulfur may be used. If the cement clinker is permitted to contain greater amounts of calcium sulfate, the fuel may contain greater amounts of sulfur. Of course, the fuel may be a mixture of petroleum coke with a sulfur content greater than 14% and other fuels with a sulfur content lower than 14% as long as the total sulfur content is approximately 14% or less.

Finally, precalciner burner 70 creates a reducing atmosphere that decomposes $NO_x$ to nitrogen, thereby reducing emission of this pollutant. As a result of the reducing atmosphere, the $NO_x$ emission levels may be at or below 200 mg of $NO_x$ per normal cubic meter of gas.

Historically, the oxygen concentration in kiln inlet 55 and at a sintering zone 270 has been maintained at 1.0 to 1.5%, with a 2% maximum. By increasing the oxygen concentration in those regions to 4.5 to 5.5%, the temperature at which calcium sulfate will decompose is raised above 1500° C., which is above the operating temperature in the kiln. Although increasing the air flow through the kiln increases the oxygen concentration in the kiln, an indiscriminate increase in air flow may cause great thermal losses because the air passing through the kiln removes heat generated by the combusting fuel; the greater the air flow, the greater the thermal and pressure losses. To increase the air flow just enough to provide the minimum oxygen concentration necessary to prevent the calcium sulfate from decomposing, i.e., 4.5 to 5.5%, the invention uses a control system based on end product sulfur concentration. To increase the oxygen concentration to the extent necessary and take advantage of the elevated decomposition temperature, the control box increases the amount of air flowing through kiln 25, and decreases the air flow to precalciner 45. Decreasing the air flow to the precalciner compensates for the pressure and thermal losses in the kiln. The control box increases the air flow to raise the oxygen concentration to 4.5 to 5.5% by increasing the speed of exhauster motor 65. By providing excess oxygen at sintering zone 270 to reduce $CaSO_4$ decomposition, the control box reduces the amount of sulfur dioxide in the preheater and precalciner. Reducing the amount of sulfur dioxide, in turn, reduces emissions and prevents depositions in the equipment.

The amount of excess oxygen necessary to shift the reaction to $CaSO_4$ is controlled based on the amount of sulfur entering the system in the fuel and raw material and the amount of $CaSO_4$ that can be a component of the finished product (e.g., a maximum concentration of 3% $CaSO_4$). Using the known rate of fuel consumption per ton of cement clinker and the concentration of sulfur in the fuel, the quantity of sulfur that can be converted into $CaSO_4$ can be calculated by the control box. If there is sulfur in the raw material, that value must be added to the amount of sulfur that can be converted into $CaSO_4$.

Using 3% as the maximum amount of $CaSO_4$ that is acceptable in one ton of cement clinker end product, the control box measures the amount of sulfur in the cement clinker, in the form of $CaSO_4$, to determine the extent to which the $CaSO_4$ is decomposing and the $SO_2$ is passing through the system. If the $CaSO_4$ is decomposing in the system, as indicated by a cement clinker sulfur content less than the needed quantity to purge the system of sulfur, the control box increases the exhauster motor's speed to increase the amount of oxygen in the kiln. The amount of sulfur in the cement clinker end product is measured by separate sulfur analyzers 77 and 79. As a backup, the oxygen concentration at kiln inlet 55 is measured and the control box records the fluctuations in oxygen concentration at the kiln inlet.

As an example of the operation of the system, if the fuel used in the burners is petroleum coke containing 10% sulfur with a caloric value of 8,000 kilocalories per kilogram, the consumption of fuel would be approximately 100 kg of petroleum coke per metric ton of clinker produced. Because 100 kilograms of 10% sulfur petroleum coke contains 10 kilograms of sulfur and the ratio by weight of sulfur to sulfur trioxide ($SO_3$) is 32 to 80, 10 kilograms of sulfur can react to form 25 kilograms of sulfur trioxide.

If the entire 25 kilograms of sulfur trioxide is contained in one metric ton of cement clinker, the clinker contains 2.5% sulfur trioxide—a concentration compatible with international norms. If the raw material contains sulfur, the fuel must contain proportionally less sulfur to prevent the concentration of sulfur trioxide in the cement clinker from exceeding 2.5–3%.

A drop in the concentration of sulfur trioxide in the cement clinker at the cooler outlet indicates that there is insufficient oxygen in the kiln and precalciner and that calcium sulfate is decomposing. To correct this, the controller uses the value of the concentration of sulfur in the cement clinker produced to increase the speed of the exhauster and further close the tertiary air duct line valve to provide additional air to the kiln, depending on the oxygen concentration at outlet line 60. The oxygen in the additional air increases the decomposition temperature of the calcium sulfate, thereby reducing the decomposition of calcium sulfate in the kiln and causing that calcium sulfate to become part of the cement clinker. The end result is an increase in sulfur trioxide in the cement clinker to 2.5%.

Although the maximum sulfur content in the cement clinker is typically in the range of 2.5 –3%, as noted above, a concentration of approximately 3.5% or higher also may be acceptable. A concentration of approximately 3.5% sulfur in the cement clinker may be obtained if the overall concentration of sulfur in the fuel is approximately 14%.

Because 100 kilograms of petroleum coke containing 14% sulfur contains 14 kilograms of sulfur, and the ratio by weight of sulfur to sulfur trioxide ($SO_3$) is 2 to 5, 14 kilograms of such coke can react to form 35 kilograms of sulfur trioxide. If the entire 35 kilograms of sulfur trioxide is contained in one metric ton of cement clinker, the clinker contains 3.5% sulfur trioxide. If the raw material contains sulfur, the fuel must contain proportionally less sulfur to prevent the concentration of sulfur trioxide in the cement clinker from exceeding 3.5%. If the petroleum coke has a sulfur content higher than 14%, such as, for example, a concentration of 20%, the petroleum coke should be mixed with another fuel to provide a fuel mix having a sulfur content of approximately 14%. In this manner, petroleum coke with extremely high concentrations of sulfur may be used to make cement clinker.

Other embodiments are within the scope of the following claims.

What is claimed is:

1. A method of producing cement clinker using high sulfur fuel, comprising:

combusting high sulfur fuel within a kiln;

introducing feed material at an inlet of the kiln;

passing the feed material through the kiln in the presence of the combusting fuel so as to sinter the feed material to form sintered material;

cooling the sintered material to form cement clinker;

measuring sulfur content of the cement clinker; and controlling a concentration of oxygen at the inlet of the kiln based on the measured sulfur content, wherein the fuel contains up to approximately 14% sulfur.

2. The method of claim 1, further comprising mounting a precalciner to the inlet of the kiln, precalcining the raw material in a precalciner using high sulfur fuel combusted in the precalciner, and feeding the precalcined raw material into the kiln.

3. The method of claim 2, further comprising preheating the raw material using combustion gases from the kiln and precalciner.

4. The method of claim 2, further comprising controlling a concentration of oxygen in the precalciner.

5. The method of claim 4, further comprising maintaining a reducing atmosphere in the precalciner to reduce $NO_x$ emissions to a level below 200 mg per normal cubic meter.

6. The method of claim 4, further comprising varying the oxygen concentration in the kiln and precalciner by adjusting a speed of an exhauster that draws air through the kiln and precalciner and varying the oxygen concentration in the precalciner by adjusting a valve positioned between the cooler and the precalciner.

7. The method of claim 2, further comprising maintaining a circulation of $SO_2$ in the process at less than 80 kg per hour to eliminate calcium sulfate and calcium sulfite deposits in the interior of the rotary kiln, cyclones and ducts between the cyclones.

8. The method of claim 1, further comprising controlling the oxygen concentration to maintain a decomposition temperature of $CaSO_4$ in the kiln at approximately 1500° Celsius and above to prevent decomposition of $CaSO_4$ in the kiln.

9. The method of claim 8, wherein the oxygen concentration in the kiln is maintained between approximately 4.5% and 5.5%.

10. The method of claim 1, wherein the cement clinker contains sufficient levels of calcium sulfate so that gypsum need not be added while grinding the cement clinker to produce cement.

11. The method of claim 1, further comprising maintaining a weight percentage of $SO_3$ in the cement clinker at approximately 3.5% or less.

12. The method of claim 1, further comprising reducing a concentration of $SO_2$ in the kiln by creating $SO_3$ by using calcium sulfite ($CaSO_3$) as an intermediate catalyst.

13. An apparatus for producing cement clinker using high sulfur fuels, comprising:
- a rotary kiln having a burner and configured to sinter the raw materials to produce sintered material;
- a cooler configured to cool the sintered material to form cement clinker;
- a sulfur analyzer configured to measure sulfur content in the cement clinker; and
- a controller configured to control the concentration of oxygen in the kiln based on the measured sulfur content, wherein the fuel contains up to approximately 14% sulfur.

14. An apparatus according to claim 13, further comprising an exhauster, wherein the controller is configured to control the concentration of oxygen in the kiln by controlling the speed of the exhauster.

15. An apparatus according to claim 13, further comprising a precalciner for precalcining the raw materials using high sulfur fuel at a precalciner burner before the raw material is sintered in the kiln.

16. An apparatus according to claim 15, wherein the controller is configured to control a concentration of oxygen in the precalciner.

17. An apparatus according to claim 16, wherein the controller is configured to maintain a reducing atmosphere in the precalciner to reduce $NO_x$ emissions to a level below 200 mg per normal cubic meter.

18. An apparatus according to claim 13, further comprising:
- a cyclone suspension preheater system for preheating and decarbonating the raw material before the raw material is fed into the kiln;
- an exhauster for pulling air trough the kiln, precalciner and cyclone suspension preheater system;
- a tertiary air line connecting the cement cooler to the precalciner to permit the flow of the air from the cooler to the precalciner;
- a tertiary air line valve in the tertiary air line to regulate the flow of air to the precalciner; and
- an oxygen analyzer to measure the concentration of oxygen in the precalciner;
- wherein the controller is configured to regulate the position of the tertiary air line valve based on oxygen concentration in the precalciner and to regulate the speed of the exhauster motor based on the sulfur content in the cement clinker.

19. An apparatus according to claim 18, further comprising:
- an oxygen analyzer at the rotary kiln's inlet to monitor oxygen concentration;
- a pair of sulfur analyzers at the outlet to the cement clinker cooler to measure the content of sulfur in the cement clinker;
- a carbon monoxide analyzer in the line to the exhauster to monitor carbon monoxide concentration; and
- an electrostatic precipitator to remove dust from the gas passing out of the exhaust of the cement clinker cooler.

* * * * *